United States Patent Office 3,041,363
Patented June 26, 1962

3,041,363
SILETHYLENESILOXANE COPOLYMERS
Robert L. Merker and William A. Piccoli, Pittsburgh,
Pa., assignors to Dow Corning Corporation, Midland,
Mich., a corporation of Michigan
No Drawing. Filed Aug. 14, 1959, Ser. No. 833,692
7 Claims. (Cl. 260—448.2)

This invention relates to certain novel organosiloxane copolymers and methods for their preparation. The copolymers consist essentially of at least two species of polymeric units selected from the group consisting of (A) units of the formula

[—Si(Ph)(Me)CH$_2$CH$_2$(Ph)(Me)SiO—]

(B) units of the formula

[—Si(Ph)$_2$CH$_2$CH$_2$(Me)$_2$SiO—]

(C) units of the formula

[—Si(Ph)$_2$CH$_2$CH$_2$(Ph)(Me)SiO—]

and (D) units of the formula

[—Si(Ph)$_2$CH$_2$CH$_2$(Ph)$_2$SiO—]

where Ph and Me represent phenyl and methyl radicals respectively.

The copolymers of this invention can be produced by mixing two or more of the corresponding cyclosiloxanes of the general formula Si(Ph)$_a$(Me)$_{2-a}$CH$_2$CH$_2$(Ph)$_b$(Me)$_{2-b}$SiO where $a$ and $b$ are integers of from 0 to 2 inclusive and have a value such that there are at least two phenyl radicals in each cyclosiloxane, and contacting the mixture in a liquid phase with an organosiloxane polymerization catalyst.

The above cyclosiloxanes can be produced by the methods shown in detail in copending application Serial No. 647,184, filed March 20, 1957, now abandoned, and in the copending application entitled "Cyclosilethylenesiloxanes and Polymers Thereof," filed of even date herewith by Robert L. Merker (Serial No. 833,693), both of said applications being assigned to the assignee of the present application. In brief, the cyclosiloxanes can be prepared by hydrolyzing the corresponding chlorosilanes of the formula ClSiPh$_a$Me$_{2-a}$CH$_2$CH$_2$Ph$_b$Me$_{2-b}$SiCl heating the resulting hydrolyzate at 200 to 300° C. in the presence of a catalyst such as KOH, NaOH or LiOH, and distilling the cyclic product out of the system under reduced pressure.

The chlorosilanes employed in the above process can be prepared by the straightforward addition reaction of compounds of the formula R$_2$HSiCl with compounds of the formula (CH$_2$=CH)R$_2$SiCl in the presence of a platinum catalyst such as chloroplatinic acid. The R radicals in the latter compounds are of course methyl or phenyl radicals attached in positions such that the particular desired chlorosilane adduct will be produced.

Any of the well known organosiloxane polymerization catalysts can be used to initiate the polymerization of the above described cyclosiloxanes. To avoid the introduction of extraneous siloxane units, obviously the polymerization should be carried out in a system in which the defined cyclosiloxanes are the only siloxanes present in the mixture. Examples of effective alkaline and acid catalysts include NaOH, KOH, LiOH, Me$_4$NOH, sulfuric acid, trifluoroacetic acid, and the alkali metal silanolates such as those of the formula Me$_3$SiOM and MO(Me$_2$SiO)$_z$M where M is Na, K, or Li, and $z$ is at least 1. Preferably $z$ is from 1 to about 10, but it can be any larger number if correspondingly more of the salt is used.

Amounts of catalyst ranging from 0.001 to 0.1 percent by weight based on the weight of the cyclosiloxanes are ordinarily suitable, although amounts up to 2 percent or more by weight can be employed. Ordinarily, however, the use of such larger amounts of catalyst is neither necessary nor advantageous.

Most of the above described catalysts will initiate the polymerization of the defined cyclosiloxanes even at room temperature. The rate of polymerization is speeded up at higher temperatures. Obviously, however, the temperature should be maintained below that at which decomposition, depolymerization, or "cracking" occurs. For this reason, polymerization temperatures below 200° C. are generally employed, and it is usually preferred to operate at temperatures ranging from 75° to 160° C.

Where the copolymerized product is going to be used at elevated temperatures, any residual catalysts in the system may degrade the product. Hence it will often be preferable to remove the catalyst after the polymerization is completed. This can be done by well known techniques such as by washing the copolymer or by deactivating the catalyst. Deactivation can be accomplished by neutralization, as where an alkali metal hydroxide catalyst is neutralized with CO$_2$. A fugitive catalyst, i.e., one which is decomposed or volatilized at a temperature above that at which it catalyzes the polymerization, but below that at which depolymerization occurs, is especially preferred. This is particularly true where the final copolymer is one which is difficult to handle by any other technique because of its high molecular weight and/or insolubility. The compound (CH$_3$)$_4$NOH is an excellent example of a preferred fugitive catalyst.

The copolymers of this invention range from high molecular weight plastic gums to tough thermoplastic resinous solids. In general, the softening point and hardness of the final product both increase as the phenyl content of the copolymer is increased. Thus, by the appropriate selection of the types and relative amounts of each polymeric unit present, one can control the flexibility, hardness, and softening point of the finished copolymer. Although any ratio of any two or more of the defined units can be used in these copolymers, the better products have from 5 to 95 mol percent of the defined (D) units present, and preferably from 35 to 85 percent of such units.

Copolymers having the consistency of plastic gums can be used as potting compounds. The harder copolymers, which are tough resins at ordinary temperatures, can be used as compression molding resins or injection molding resins. Fibers can be drawn from hot melts of the latter type of copolymer, and films can be cast from solutions of those copolymers which are soluble in organic solvents. Copolymers which contain increasing amounts of [—SiPh$_2$CH$_2$CH$_2$Ph$_2$SiO—] units tend to be increasingly insoluble in organic solvents, and articles prepared from such copolymers can be used beneficially where oil or solvent resistance is important. Optimum combinations of properties are obtained from copolymers containing from 35 to 75 mol percent of the latter units and from 65 to 25 mol percent of

[—SiPh$_2$CH$_2$CH$_2$PhMeSiO—]

units.

The following examples are illustrative only. The symbols Me and Ph have been used to represent methyl and phenyl radicals respectively.

EXAMPLE 1

A series of copolymers was prepared from mixtures of the cyclic silethylenesiloxanes of the formulae

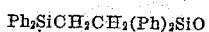
$Ph_2SiCH_2CH_2(Ph)_2SiO$ and

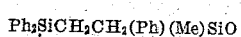
$Ph_2SiCH_2CH_2(Ph)(Me)SiO$

For convenience, the latter cyclics and the units derived therefrom will be referred to hereinafter as "$Ph_4$" and "$Ph_3Me$" materials. The mixtures ranged from 40 to 85 percent by weight of the $Ph_4$ cyclics. Each mixture was copolymerized by heating it to about 112° C. to make it homogeneous, degassing the mixture under high vacuum, blanketing the mixture with dry nitrogen, degassing and blanketing with nitrogen once more, and then adding a toluene solution of potassium dimethylsilanolate in an amount sufficient to provide 0.006 percent by weight $K_2O$ based on the weight of the cyclics. Each mixture was shaken vigorously to disperse the catalyst, and was then degassed once more and heated at about 112° C. for 2 hours. The solid polymers which were produced in this fashion were ground to the powdered state, and the softening temperature of each copolymer was determined. The softening temperature was taken as that temperature at which neighboring copolymer particles would coalesce under slight pressure and remain permanently deformed. The composition of each copolymer and its corresponding softening temperature is shown in Table I below.

Table I

| Wt. percent, $Ph_4$ unit: | Softening Temp., °C. |
|---|---|
| 40 | 140 |
| 50 | 185 |
| 65 | 200 |
| 75 | 230 |
| 85 | 275 |

EXAMPLE 2

A mixture of 40 g. of the $Ph_4$ cyclic and 60 g. of the $Ph_3Me$ cyclic was copolymerized using the technique of Example 1, except that the catalyst employed was 0.0148 g. of $(CH_3)_4NOH$ and the polymerization was carried out at about 90° C. for 18 hours. The mixture became a solid mass within 2 hours after exposure to this temperature. In order to destroy the catalyst, the copolymeric product was heated at about 195° C. for 2 hours with the system under high vacuum. 94 g. of the copolymeric product was dissolved in 1350 ml. of hot toluene. The solution was diluted to 1900 ml. with additional toluene and the copolymer was precipitated therefrom by the addition of 1500 ml. acetone followed by the addition of 2000 ml. methanol. The precipitated copolymer was washed with acetone and dried to a constant weight of 85.4 g., thus providing a hard, opaque white solid product having a softening point of about 140° C. It was found that this copolymer could be conveniently injection molded at a temperature of about 240° C. and 100 p.s.i. pressure.

For testing purposes, the above copolymer was compression molded at 140° C. and under 2 to 4 tons pressure into ½″ x ½″ x 5″ test bars. These bars were used to measure the Izod impact strength (ASTM D256) and the flexural strength (ASTM D790) of the copolymer. Specimens which were broken in these tests were reprocessed by dissolving 64 g. of the broken test bars in 1250 ml. of hot toluene. After filtering the hot solution, 1200 ml. methanol was slowly added to the filtrate to precipitate the copolymer as a powder. The powder was separated, dried at 60° C., and was then compression molded into test bars at 146° C. and 2 tons pressure. Specimens one inch in length were cut from the test bars for the determination of compressive strengths (ASTM D695) and Rockwell hardness (ASTM D285). The average values obtained in the above tests were as follows.

Impact strength: 0.28 foot-lbs. per inch,
Flexural strength: 2,060 lbs. per square inch,
Rockwell hardness: R112,
Compressive strength: 13,100 lbs. per square inch.

This particular copolymer was found to be soluble in hot aromatic solvents such as α-chloronaphthalene, o-bromoanisole, and toluene. Solutions of but a few percent of copolymer in concentration exhibited a thixotropic structure formation between the copolymer and solvent upon cooling. Hot toluene was able to dissolve somewhat more than 7 percent by weight of the copolymer but retained less than 0.2879 g. copolymer per 50 ml. solution when allowed to come to equilibrium at room temperature, thus illustrating the relatively high solvent resistance of these copolymers as compared to the conventional organopolysiloxanes.

EXAMPLE 3

When a mixture of 80 percent by weight of the $Ph_4$ cyclic, 15 percent by weight of the $Ph_3Me$ cyclic and 5 percent by weight of either of the cyclics

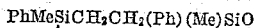
$PhMeSiCH_2CH_2(Ph)(Me)SiO$ (hereafter PhMePhMe) or

$Ph_2SiCH_2CH_2(Me)_2SiO$ (hereafter $Ph_2Me_2$) is copolymerized by the technique of Example 1, the resulting copolymer is a thermoplastic resin which is softer and more flexible and which has a lower softening point than the resin obtained from the 85 percent $Ph_4$-15 percent $Ph_3Me$ copolymer of that example.

EXAMPLE 4

When a 50:50 mixture of the PhMePhMe and $Ph_2Me_2$ cyclics is copolymerized by the technique of Example 1, a soft plastic gum-like copolymer is obtained. The addition of either $Ph_4$ or $Ph_3Me$ cyclics to the system prior to copolymerization brings about the formation of increasingly harder and higher softening point copolymeric resins. Comparable resins are produced by the use of 0.1 percent by weight of sulfuric acid or trifluoroacetic acid as catalysts in place of the potassium salt.

That which is claimed is:

1. An organosiloxane copolymer consisting essentially of at least two species of polymeric units selected from the group consisting of (A) units of the formula

$[-Si(Ph)(Me)CH_2CH_2(Ph)(Me)SiO-]$ (B) units of the formula

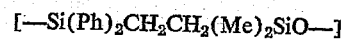
$[-Si(Ph)_2CH_2CH_2(Me)_2SiO-]$ (C) units of the formula

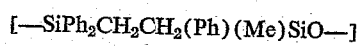
$[-SiPh_2CH_2CH_2(Ph)(Me)SiO-]$ and (D) units of the formula

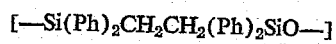
$[-Si(Ph)_2CH_2CH_2(Ph)_2SiO-]$ where Ph and Me represent phenyl and methyl radicals respectively.

2. An organosiloxane copolymer in accordance with claim 1, wherein (D) units are present in an amount of from 5 to 95 inclusive mol percent.

3. An organosiloxane copolymer in accordance with claim 1, wherein (D) units are present in an amount of from 35 to 85 inclusive mol percent.

4. An organosiloxane copolymer consisting essentially of from 25 to 65 inclusive mol percent of units of the formula [—Si(Ph)$_2$CH$_2$CH$_2$(Ph)(Me)SiO—], and from 75 to 35 inclusive mol percent of units of the formula [—Si(Ph)$_2$CH$_2$CH$_2$(Ph)$_2$SiO—], where Ph and Me represent phenyl and methyl radicals respectively.

5. A process for the preparation of an organosiloxane copolymer which comprises contacting, in a liquid phase, an intimate mixture of at least two different cyclosiloxanes of the general formula

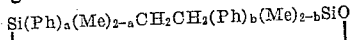

where Ph and Me are phenyl and methyl radicals respectively and $a$ and $b$ are integers of from 0 to 2 inclusive and have a value such that there are at least two Ph radicals in each cyclosiloxane, with an organosiloxane polymerization catalyst, the defined cyclosiloxanes being the only siloxanes present.

6. A process for the preparation of an organosiloxane copolymer which comprises contacting, in a liquid phase, a cyclosiloxane of the formula

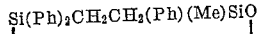

a cyclosiloxane of the formula

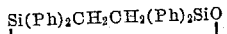

and a catalytic quantity of (CH$_3$)$_4$NOH at a temperature of at least 75° C., the defined cyclosiloxanes being the only siloxanes present.

7. A process for the preparation of an organosiloxane copolymer which comprises contacting, in a liquid phase, an intimate mixture of at least two different cyclosiloxanes of the general formula

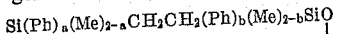

where Ph and Me are phenyl and methyl radicals respectively and $a$ and $b$ are integers of from 0 to 2 inclusive and have a value such that there are at least two Ph radicals in each cyclosiloxane, with an organosiloxane polymerization catalyst selected from the group consisting of naOH, KOH, LiOH, (CH$_3$)$_4$NOH, concentrated sulfuric acid, trifluoroacetic acid, and siloxane salts of the formulae (CH$_3$)$_3$SiOM and Mo[(CH$_3$)$_2$SiO]$_z$M where M represents a metal atom selected from the group consisting of Na, K, and Li, and $z$ is at least one, the defined cyclosiloxanes being the only siloxanes present.

References Cited in the file of this patent

UNITED STATES PATENTS

| | | |
|---|---|---|
| 2,562,000 | Sveda | July 24, 1951 |
| 2,592,682 | Goodwin | Apr. 15, 1952 |
| 2,793,222 | Kantor et al. | May 21, 1957 |

UNITED STATES PATENT OFFICE
CERTIFICATE OF CORRECTION

Patent No. 3,041,363                                        June 26, 1962

Robert L. Merker et al.

It is hereby certified that error appears in the above numbered patent requiring correction and that the said Letters Patent should read as corrected below.

Column 6, line 16, for "naOH" read -- NaOH --; line 17, for "Mo[$(CH_3)_2SiO]_zM$" read -- MO[$(CH_3)_2SiO]_zM$ --.

Signed and sealed this 20th day of November 1962.

(SEAL)
Attest:

ERNEST W. SWIDER                                       DAVID L. LADD
Attesting Officer                                         Commissioner of Patents